United States Patent [19]

Volcher

[11] Patent Number: 4,844,028
[45] Date of Patent: Jul. 4, 1989

[54] METHOD FOR REDUCING THE CONSUMPTION OF FUEL OF A HEAT ENGINE WHICH EMPLOYS COMBUSTION OF HYDROCARBONS, AND FOR REDUCING ATMOSPHERIC POLLUTANTS, AND DEVICE FOR CARRYING OUT THIS METHOD

[76] Inventor: Roger Volcher, Aarestrasse, 15, CH-2555 Brugg, Switzerland

[21] Appl. No.: 19,744

[22] Filed: Feb. 27, 1987

[30] Foreign Application Priority Data

Aug. 13, 1986 [LU] Luxembourg .......................... 86553

[51] Int. Cl.⁴ ............................................. F02B 43/00
[52] U.S. Cl. ...................................... 123/25 P; 123/3
[58] Field of Search ...................... 123/3, 25 P, DIG 6

[56] References Cited

U.S. PATENT DOCUMENTS

| 3,682,142 | 8/1972 | Newkirk | 123/3 |
| 3,717,129 | 2/1973 | Fox | 123/3 |
| 3,926,850 | 12/1975 | Kostka | 123/3 |
| 4,030,453 | 6/1977 | Sugimoto | 123/3 |
| 4,037,568 | 7/1977 | Schreiber | 123/3 |
| 4,109,461 | 8/1978 | Fujitani et al. | 123/3 |
| 4,333,422 | 6/1982 | Mahoney | 123/3 |
| 4,380,970 | 4/1983 | Davis | 123/3 |
| 4,573,435 | 3/1986 | Shetton | 123/3 |
| 4,622,924 | 11/1986 | Lewis | 123/3 |

FOREIGN PATENT DOCUMENTS 8105682  7/1983  Netherlands .................... 123/25 P Primary Examiner—Willis R. Wolfe
Assistant Examiner—M. Macy
Attorney, Agent, or Firm—Steinberg & Raskin

[57] ABSTRACT

Method and device for reducing consumption of fuel by an engine, which involves saturating intake air or an air-fuel mixture with steam which is then dissociated prior to entering the engine.

8 Claims, 2 Drawing Sheets

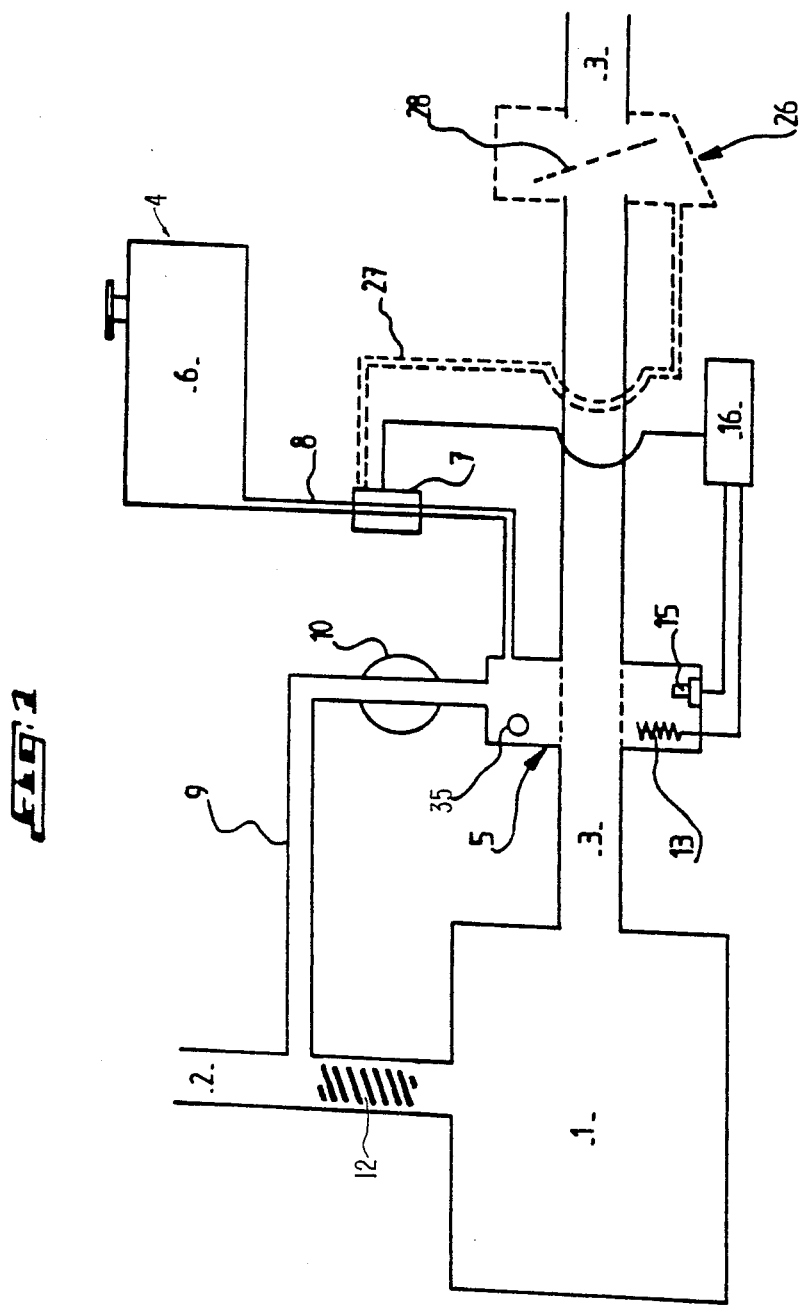

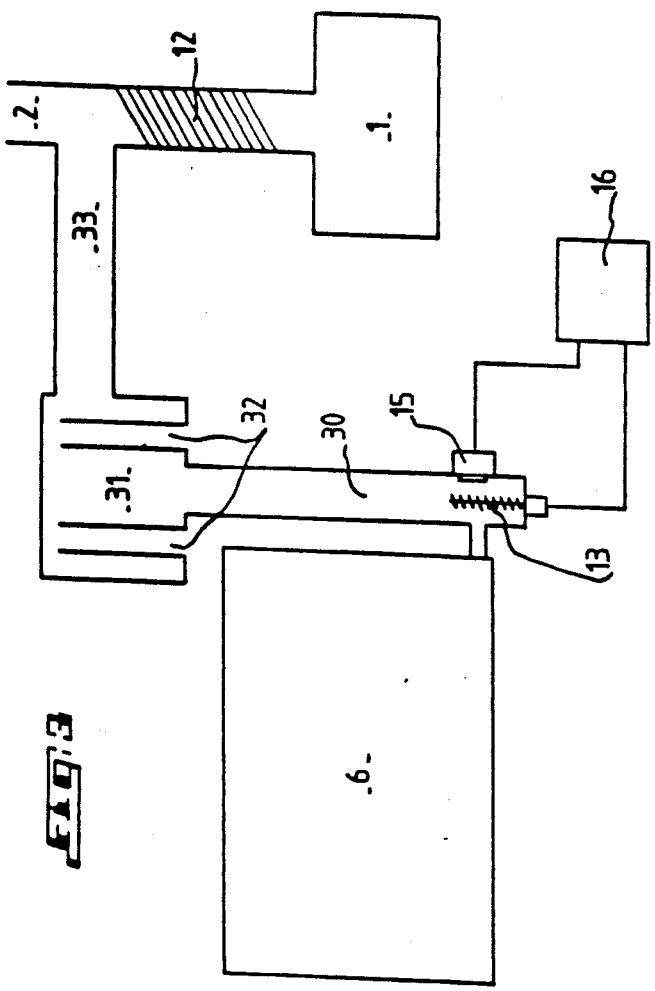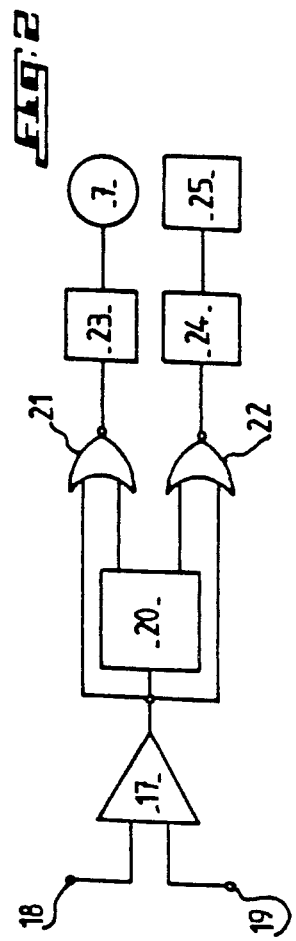

METHOD FOR REDUCING THE CONSUMPTION OF FUEL OF A HEAT ENGINE WHICH EMPLOYS COMBUSTION OF HYDROCARBONS, AND FOR REDUCING ATMOSPHERIC POLLUTANTS, AND DEVICE FOR CARRYING OUT THIS METHOD

BACKGROUND OF THE INVENTION

The present invention concerns a method essentially for reducing the fuel consumption of a heat engine burning hydrocarbon, such as an internal combustion engine, and for reducing the atmospheric pollutants produced by this machine, also a device for carrying out this method.

Methods are already known which, for such a purpose, propose introduce steam into the intake manifold through which the intake air, or the mixture of intake air and fuel, passes to enter a combustion chamber of the engine. The intake air or the said mixture, containing water vapour, is then brought into contact with an alloy composed of ferrous or non-ferrous metals emanating from rare earths which oxidise in this condition and whose oxides have the property of dissociating water.

SUMMARY OF THE INVENTION

The present invention has as its object improvement of such a known method.

To achieve this object, the method according to the invention is characterised in that the introduction of the steam into the intake manifold is carried out in such a manner that the relative humidity of the intake air increases to the maximum and in that this maximum relative humidity corresponding to the state of saturation of the air with steam is maintained by regulation.

According to an advantageous feature of the invention, maintaining the state of saturation of the air with steam is effected by aspiration of the steam from a source of appropriate capacity, advantageously at a place nearest to the combustion chamber, under the effect of the natural aspiration of the combustion air.

The steam supply device for carrying out this method, which comprises a water tank and a device producing steam to be introduced into the intake manifold is characterised in that it comprises means for regulating the quantity of water in the steam generating device for ensuring that a quantity of steam is permanently available for maintaining the aforesaid saturation state of the intake air of the engine.

According to an advantageous feature of the invention the said means comprise essentially an element monitoring the quantity of water in the heat exchanger.

According to a further feature of the invention the said element is formed essentially by a temperature pickup such as a thermistor situated in the interior of the exchanger such that a lowering of the level of water in the exchanger below a reference level is detected by the pickup and causes the emission of a signal indicating a lack of water in the form of a rise in temperature.

According to another feature of the invention the steam generating device is formed of a heat exchanger which is situated advantageously at the hottest point of the burned gases outlet and may comprise a heating element, advantageously using electrical energy, for the water contained in the exchanger, and in that a pump capable of operating intermittently is situated between the tank and the exchanger, this pump being controlled by said regulating means.

According to yet another advantageous feature of the invention the regulating means comprise an electronic circuit comprising a comparator comparing the signal produced by said temperature pickup with a reference value, and a logic circuit starting the operation of the pump within a specific period of time after the production of a signal by said pickup following a reduction of the level of water below its reference value, it being possible to provide means for triggering an alarm after the said period has elapsed if the water shortage condition has not been remedied within the said period.

According to yet another advantageous feature of the invention the heat exchanger is situated advantageously at the hottest pint of the burned gases outlet and may comprise a heating element, advantageously using electrical energy, for the water contained in the exchanger.

According to another feature of the invention the steam generating device is formed of a boiler supplied with water by the tank according to the principle of communicating vessels, and in that the steam produced in the boiler is accumulated in a steam accumulator.

BRIEF DESCRIPTION OF THE DRAWINGS

The invention will be better understood and other aims, features, details and advantages of the invention will be better apparent from reading the explanatory description which follows with reference to the accompanying diagrammatic drawings given solely by way of example and illustrating several constructional forms of the invention and in these drawings:

FIG. 1 is a diagrammatic view of a first constructional form of a steam supply device according to the present invention;

FIG. 2 shows in the form of a block schematic an electronic circuit for control of the pump, according to the present invention; and FIG. 3 is a diagrammatic view of a second constructional form of the present invention.

DESCRIPTION OF THE PREFERRED EMBODIMENTS

In FIG. 1 the reference numerals 1, 2 and 3 indicate respectively the combustion chamber of a heat engine such as an internal combustion engine, and the intake and exhaust manifolds of this engine. The reference numeral 4 is given to the device for maintaining, by regulation, a state of saturation of the intake air or the mixture of intake air and fuel with steam, said air or mixture being transported through the intake manifold 2 towards the combustion chamber 1.

This steam supply device 4 comprises essentially a heat exchanger 5, a water tank 6, and a pump 7 adapted to supply the heat exchanger 5 with water from the tank 6 by way of the pipe 8. The outlet of the exchanger 5 intended for the steam produced in this exchanger is connected to the intake manifold 2 by a pipe 9 in which a condenser 10 is fitted. It will be noted that the pipe 9 debouches into this manifold 2 at a place as near as possible to the combustion chamber 1. The manifold 2 contains in its portion situated between the inlet of the pipe 9 and the combustion chamber 1 a catalytic system diagrammatically indicated at 12, which is formed of an alloy composed of ferrous or non-ferrous metals emanating from rare earths, the said alloy having to be capable of oxidising, and these oxides having to have the property of dissociating water. This alloy, besides the metals capable of dissociating water, is to be composed advantageously of one or more lanthanides or actinides, in a percentage to be determined in accordance with the possibilities of employment of the alloy, obligatorily 25 to 30% lanthanum.

The heat exchanger 5 is arranged on the exhaust manifold 3 at the hottest part of the burned gases outlet. To ensure an adequate steam supply, a heating element 13 using electrical energy may be provided within the exchanger 5.

The heat exchanger 5 also comprises at 15 an element ensuring that the supply of water by means of the pump 7 allows sufficient production of steam. This element is advantageously formed of a temperature pickup such as a thermistor. The pickup is arranged inside the exchanger in such a manner that it is situated below a water level representing a sufficient water supply. Thus the pickup is situated in an environment the temperature of which cannot exceed a threshold, which is that of 100° C. when the water is boiling and at atmospheric pressure. On the other hand when the water level within the exchanger drops below a limit value and uncovers the pickup, the latter is exposed to a temperature greater than 100° C., and produces an electrical signal, since the attainment of the lower limit threshold signifies a lack of water in the exchanger.

This electrical signal will be transmitted to an electronic device comprising a control circuit 16 for the pump 7. This circuit is shown in FIG. 2 and comprises a comparator 17 with two inputs 18 and 19 receiving respectively the signal produced by the pickup 15 and a reference signal. The output of the comparator is connected to the input of a delay element 20 such as a monostable multi-vibrator whose outputs Q and $\overline{Q}$ are connected respectively to an input of the NOR gates 21, 22 of the two-input type. The other input of these two gates is connected to the output of the comparator 17. The output of the gate 21 is connected to a power circuit 23 of the pump 7. The output of the gate 22 is connected to a power circuit 24 which controls an indicating and alarm element 25.

As for the heat exchanger 5, it comprises at its upper portion a hole 35 intended to serve several purposes. It constitutes a kind of overflow in the event of a regulation failure, for preventing water from entering the combustion chambers. It is to ensure that the exchanger is subjected to atmospheric pressure, and is able to allow a flow of air in the steam conduit 9.

FIG. 1 shows in broken lines something which may be added to the device which has just been described, a recovery arrangement for condensate or even for steam directly, formed of a condenser 26 situated directly in the exhaust manifold 3, which returns the water thus collected to the pump 7, through a pipe 27. 28 indicates diagrammatically a cooling baffle. This recovery arrangement contributes further to the optimum operation of the regulating device according to the present invention.

A description will now be given of the operation of the system according to the invention shown in FIG. 1.

It will be readily understood that the intake air or the air mixture which flows in the intake manifold 2 becomes saturated with steam on passing the mouth of the steam pipe 9. The intake of the steam is effected in a natural way by a suction effect. If the quantity of steam available continues to be sufficient, this state of saturation, or maximum relative humidity, can be maintained.

The heat exchanger is equipped such that its steam production can be regulated automatically by appropriate control of the pump 7. In fact, as soon as the temperature pickup 15 within the exchanger 5 detects a temperature greater than the reference temperature of for example 100° C. following a lowering of water level in the exchanger, it transmits a signal to the input 18 of the comparator 17, which establishes a potential greater than the reference potential at the input 19. The output of the comparator and one input of the two NOR gates 21, 22 then changes to the zero state. The delay element 20 holds its outputs Q and $\overline{Q}$ in the zero and one states respectively for a period of time which is predetermined and is for example 15 to 20 seconds. The output of the NOR gate 21 changes to the one state, which causes the pump 7 to start operating. On the other hand the output of the NOR gate 22 remains in the zero state, which prevents actuation of the alarm device 25. The pump 7 thus started will re-establish the water level in the exchanger. The fresh water arriving into the latter will very rapidly produce a temperature below the 100° reference temperature, and the comparator will receive the instruction from the pickup 15 to stop the pump. If within the time period predetermined by the delay element 20 the water level has not been re-established, for example by reason of breakdown of the pump 7 or a lack of water in the water tank 6, the output states of the delay element 20 will reverse, resulting in the actuation of the alarm device 25 and the production of a stop signal for the pump 7. Thus the user will be warned of the lack of water and could for example stop the engine or a burner.

Because of this regulating system it is possible to stabilise a small quantity of water of for example 50 cl in the exchanger. The tank 4 could contain 3.5 l or more, and could be placed in available situation in the engine compartment of a motor vehicle or in any other location, even in the boot of the vehicle. The condenser 10, which interrupts the steam conduit or pipe 9 half-way between the exchanger 5 and the entrance to the combustion chambers, is formed of a small casing of for example half a liter size which allows partial condensation of steam in the pipe, that is to say insufficiently hot steam, and also the cooling thereof. The condensed fraction returns to the exchanger by virtue of the physical gradient. This casing may also be considered as a steam reserve when the engine for example is idling.

As regards the heating element 13 which uses electrical energy, it could have for example a power of 100 to 200 watts and a voltage of 12 to 15 volts according to need. The object of this heating element is to make up largely for inadequate natural heat exchange at the exchanger in contact with the outgoing burned gases. However, its consumption of electricity represents in power only 10 to 15% of the benefit which it brings. It would also be possible to protect the heat exchanger with an isothermal envelope so as to prevent it from cooling due to the passage of the ambient air.

To obtain the maximum benefit from the regulation of the relative humidity of the intake air or of the air-hydrocarbon mixture which has to be admitted to the combustion chamber 1 to its maximum value, just before entry into this chamber 1, it is advantageous to choose the catalyst alloy charge 12 such that the oxides of this alloy have a grain size for example of the order of 1 to 2μ. They are thus easily transportable by the flow of air entering the combustion chamber, and are thus at the centre of the catalysis to give a new type of fuel, namely nascent hydrogen, and a perfect fuel namely oxygen. The presence of this nascent hydrogen undeniably improves the combustion phenomenon proper. Since some of the elements of the alloy have a melting point such that it would not have been possible technically to place them at the place where combustion occurs, this alloy is stored outside the engine, and thus only the oxides of this alloy are used and these, having the same chemical properties, give the anticipated results. The fact of having saturated the entering air to the maximum means that a proportion of liquid ($H_2O$) is added in place of a dry air, which physically at that instant (in the combustion chamber) is considered as a gas and thus as a compressible element. Thus better filling of the combustion chambers is achieved, and the compression ratio in the cylinders is improved. A very particular development of the combustion operation is found to occur. A very appreciable drop can be measured in the temperatures in the region of outflow from the combustion chamber of a petrol engine for example. Indeed thanks to the invention the combustion operation is quickened so that even at high speed of rotation the gaseous mass is completely burned and thus completely transformed into energy before the opening of the exhaust valves. Because of the addition of oxygen and nascent hydrogen, the invention makes it possible to use a fuel of lower quality, for example free from lead, or of a lower octane number.

Since the combustion of the hydrocarbon mixture is rapid and total, a reduced emission of unburned substances and harmful gases is found, such as are normally produced by residual heat of combustion. It is also to be noted that the invention allows the correction of bad air-fuel mixtures. In fact the carburettor is the motor car component which basically has evolved least in recent years and the perfect air-petrol mixture is only very rarely obtained in actual road use, perhaps 10% of the running time approximately. It will be seen, then, that the engine runs for 90% of its life either with too poor a mixture or with too rich a mixture, and consequently the efficiency is less than what it should be in theory. This disadvantage can be obviated with the present invention. It is important to pint out that the invention requires no technical modification in the engine area, but gives the engine the chance of profitting from its fuel to the maximum effect.

Referring now to FIG. 3, a second constructional form of the invention will now be described. The reference numerals 1, 2, 6, 12, 13, 15 and 16 designate respectively as in FIG. 1 the combustion chamber, the intake manifold, the water tank, the alloy charge, the heating element, the temperature pickup, and the control circuit providing the regulation proposed by the present invention.

The device according to FIG. 3, which observes the same operating principle as the constructional form shown in FIG. 1, may in some assembly circumstances be found easier and more appropriate for certain engines, for example in engines of the "static" type, namely engines for boats, locomotives, compressors etc.

The device shown in FIG. 3 is characterised especially in that is uses the effect of communicating vessels and a wholly electrical steam generating device, with a power of for example 100 to 200 watts and of a voltage according to requirements, the electrical consumption, however, amounting only to 10 to 15% of the benefit afforded by the present invention.

The device is supplied by the water tank 6 which itself may, in some circumstances, be permanently supplied via a float valve not shown here when availability of water is possible. The tank 6 supplies water to a boiler 30 wherein the water is kept continually at the same level as in the tank 6, by the principle of intercommunicating vessels. The water in the boiler is kept in the boiling condition by means of the heating element 13. The steam produced in the boiler 30 is stored in a steam accumulator 31.

When the engine draws-in intake air or the air-fuel mixture, a flow of air is created in the steam accumulator 31 because of the air-connection tubes 32, thus carrying steam via the steam pipe 33 to the combustion chamber 1. The drawing-in effect proceeding as the steam is produced allows quicker evaporation, making it possible to obtain regulation of the steam production. In the event of a lower steam demand, the steam accumulates in the steam accumulator 31, condenses, and then falls into the boiler 30.

As before, in the event of a lack of water in the boiler 30, the pickup 15 is adapted to cut off, through the agency of the control circuit 16, the electrical supply of the heating element 13.

The aspiration of the steam is effected by the natural aspiration of the combustion air by means of the pipe 33 which is taken to a place naturally nearest to the combustion chamber 1, in the region of introduction of the air or the air-hydrocarbon mixture. It should be noted that the catalytic alloy 12 may also be arranged in the steam pipe 33. The flow of steam established by negative pressure between the steam accumulator 31 and the entry to the engine serves in this case as an ideal carrier for the oxides produced from the alloy 12.

In the case of an engine provided with a plurality of carburettors, the delivery of the steam pipe will be divided into equal parts so as to supply each of the carburettors or air conduits in the same way as described above. If the engine is of a kind supplied by injection, the steam is to be delivered into the air pipe supplying the engine. If the engine is equipped with a turbocompressor, the steam should be introduced before the turbo. In the case of a burner of the domestic heating type, the steam will be introduced into the combustion air in such a way that a maximum of saturated air loaded with oxides is taken off for the primary combustion of the burner.

Of course the present invention is in no way limited to the constructional forms illustrated and described above. In fact these have been given purely by way of example. The invention covers all analogous or equivalent solutions and variants which are within the scope thereof.

I claim:

1. Steam supply device for a combustion engine comprising at least one combustion chamber and an intake manifold through which intake air or a mixture of intake air and fuel passes to enter said combustion chamber, said device comprising a water tank coupled to a steam generating device for producing steam from water coming from said tank, duct means for coupling said steam generating device to said intake manifold for the introduction of steam into said manifold, and means for regulating quantity of water in the steam generating device for ensuring that a quantity of steam is permanently available for maintaining a state of saturation of the engine intake air or intake mixture with steam, said steam generating device being a boiler supplied with water by the tank in accordance with the principle of communicating vessels and comprising a water heating element, and the steam produced in the boiler being stored in a steam accumulator which comprises air-connection tubes intended to create a flow of air in the steam accumulator when the engine aspirates intake air or an air-fuel mixture.

2. Steam supply device according to claim 1, characterized in that said regulating means comprise an element monitoring the level of water in said steam generating device.

3. Steam supply device according to claim 2, characterized in that said element of said regulating means comprises a temperature pickup or a thermistor situated within said generating device in such a manner that a drop of the water level in the device below a reference level is detectable by the pickup or thermistor in the form of a rise in temperature and causes emitting of a signal indicating a lack of water.

4. Steam supply device accordingly to claim 1, characterized in that said steam generating device comprises a heat exchanger which is situated at the outlet of the burned gases, and a pump adapted to operate intermittently is arranged between the tank and said exchanger, this pump being controlled by said regulating means.

5. Steam supply device according to claim 1, wherein said regulating means comprise an electronic circuit comprising
   a comparator comparing the signal indicating a lack of water produced by said pickup with a reference value, and
   a logic circuit ensuring starting of the pump a predetermined period of time after production of the signal by said pickup.

6. The steam supply device of claim 5, additionally comprising means for producing an alarm after the period has elapsed if the lack of water has not been remedied within that period.

7. Steam supply device according to claim 1, wherein the steam accumulator is shaped so that in the event of a reduced need for steam, the steam accumulates in the accumulator and, then condensing, falls back into the boiler.

8. Steam supply device according to claim 1, wherein the pickup is adapted to cut off the electrical supply to the heating element in the event of a lack of water in the boiler.

* * * * *